US012111559B2

(12) United States Patent
Muranaka et al.

(10) Patent No.: US 12,111,559 B2
(45) Date of Patent: Oct. 8, 2024

(54) OPTICAL SWITCH

(71) Applicant: Nippon Telegraph and Telephone Corporation, Tokyo (JP)

(72) Inventors: Yusuke Muranaka, Musashino (JP); Tatsushi Nakahara, Musashino (JP); Toshikazu Hashimoto, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 265 days.

(21) Appl. No.: 17/768,774

(22) PCT Filed: Oct. 16, 2019

(86) PCT No.: PCT/JP2019/040707
§ 371 (c)(1),
(2) Date: Apr. 13, 2022

(87) PCT Pub. No.: WO2021/075002
PCT Pub. Date: Apr. 22, 2021

(65) Prior Publication Data
US 2023/0095427 A1    Mar. 30, 2023

(51) Int. Cl.
*G02F 1/313* (2006.01)
*G02B 6/12* (2006.01)
*G02F 1/015* (2006.01)

(52) U.S. Cl.
CPC ............. *G02F 1/3136* (2013.01); *G02B 6/12* (2013.01); *G02F 1/015* (2013.01); *G02F 1/313* (2013.01)

(58) Field of Classification Search
CPC ........ G02F 1/035; G02F 1/212; G02F 1/3136; G02F 1/3138
See application file for complete search history.

(56) References Cited

U.S. PATENT DOCUMENTS 6,999,652 B2 *   2/2006   Mino .................... G02F 1/3136
                                                              385/16
8,744,219 B2 *   6/2014   Kato .................... G02F 1/0327
                                                              385/3
(Continued)

FOREIGN PATENT DOCUMENTS

JP          2016-218297 A        12/2016

OTHER PUBLICATIONS

Toshio Watanabe et al., *Silica-Based PLC 1 x 128 Thermo-Optic Switch*, 27th European Conference on Optical Communication (ECOC01), Sep. 30, 2001, pp. 134-135.

*Primary Examiner* — Daniel Petkovsek
(74) *Attorney, Agent, or Firm* — Workman Nydegger

(57) ABSTRACT

An optical switch includes 2-input 2-output optical switches connected in a multistage, an optical gate provided at each of N-th optical output ports, a driving circuit for operating the 2-input 2-output optical switch, and a driving circuit for operating the optical gate. The driving circuits for operating the 2-input 2-output optical switches are integrated in the vicinity of a control electrode on a waveguide of the 2-input 2-output optical switch. The driving circuits for operating the optical gates are integrated in the vicinity of a control electrode on a waveguide of the optical gates. The waveguide of the 2-input 2-output optical switch and the waveguide of the optical gate each has a p layer, an i layer, and an n layer sequentially formed on a semi-insulating substrate. The optical switch has a trench reaching the semi-insulating substrate between the 2-input 2-output optical switch and the optical gate.

19 Claims, 11 Drawing Sheets

(56) References Cited

U.S. PATENT DOCUMENTS

| | | | |
|---|---|---|---|
| 11,561,452 B2* | 1/2023 | Tzuang | G02F 1/3136 |
| 2023/0194952 A1* | 6/2023 | Muranaka | G02F 1/3138 |
| | | | 385/8 |

* cited by examiner

OPTICAL SWITCH

TECHNICAL FIELD

The present disclosure relates to an optical switch, and relates to an optical switch element of an important optical component for supporting a large capacity optical communication network.

BACKGROUND ART

In recent years, with an advance of various network services, the communication traffic has been rapidly increasing. Expansion of the transmission capacity due to the wavelength multiplexing technology, and a study of the phase modulation and the multi-level modulation high in bandwidth utilization efficiency have proceeded, so that higher-level various large capacity optical signals have been transferred on an optical communication network.

A network includes a plurality of links and nodes. For each of the links and the nodes, research and development have been performed for high-speed and large-capacity communication. For the link, an increase in speed of a signal and multiplexing of wavelengths have been proceeding. On the other hand, for the node, the technology of flexibly changing the path for establishing a connection between the nodes has been regarded as important in order to implement an efficient traffic. A general network is known in which at the input end of a node, an optical signal is converted into an electric signal, and switching is performed in an electric signal state, and at the output end of the node, again, the electric signal is converted into an optical signal, thereby transmitting an optical signal through an link. In the case of the general network, various problems such as occurrence of delay and consumption of enormous electric power are caused against buffering for converting from an optical signal into an electric signal. Under such circumstances, various transferring methods have been studied as the node technologies. The optical switching technology not requiring the conversion from an optical signal into an electric signal, or conversion from an electric signal into an optical signal is the technology effective in power consumption and delay of network equipment, and the like. An optical transmission system mainly composed of the optical switching technology has been actively studied.

As the essential optical switch of the optical switching technology, research and development have been conducted on a Thermo-optics: TO switch configured on a Planar Lightwave Circuit: PLC, a switch using an InP type electro-absorption modulator: EAM, a Mach-Zehnder interferometer: MZI, or a Semiconductor Optical Amplifier: SOA, a phase modulator type switch of a LiNbO3 system. A TO switch configured on a PLC has been proposed (see e.g., NPL 1).

FIG. 1 shows a main configuration example of an n-input n-output (N×N) optical switch. As shown in FIG. 1, the N×N optical switch can be configured by connecting, for example, N-th 1×N optical switches $101_1$ to $101_N$ and N-th N×1 optical switches $102_1$ to $102_N$. The optical signal (e.g., optical packet) inputted from optical input ports $PI_1$ to $PI_N$ is outputted toward N×1 optical switches $102_1$ to $102_N$ connected to desirable optical output ports $PO_1$ to $PO_N$ by 1×N optical switches $101_1$ to $101_N$, and is outputted from desirable optical output ports $PO_1$ to $PO_N$. As a result, it is possible to implement a non-blocking type N×N optical switch capable of given connection not depending upon the connection states of other ports.

FIG. 2 shows a 1×N optical switch using a compound semiconductor material. The 1×N optical switch of FIG. 2 includes three 2×2 optical switches $201_1$ to $201_3$ arranged in a tree shape, and N-th optical gates $202_1$ to $202_N$ connected to the 2×2 optical switches $201_2$ and $201_3$. Incidentally, FIG. 2 shows the case where N=4. The optical signal inputted from the optical input port $PI_1$ of the 2×2 optical switch $201_1$ is waveguided and outputted to the optical gate $202_1$ of the desirable optical output port (e.g., $PO_1$) by switching among the optical paths of the 2×2 optical switches $201_1$ to $201_3$. On the other hand, the crosstalk light leaked out to the optical gates $202_2$ to $202_4$ connected to other optical output ports (e.g., $PO_2$ to $PO_4$) than the desirable optical output port is blocked by the optical gates. In this manner, switching is implemented. For the 2×2 optical switches $201_1$ to $201_3$, a MZI or the like is used, and for the optical gates $202_1$ to $202_4$, an EAM, a SOA, or the like is used.

Normally, when an electric field applying type optical device is driven in a device such as a router, using an electronic circuit such as a FPGA (field programmable gate array), an ASIC (application specific integrated circuit), a circuit for digital-analog converting a signal from the outside, for example, a signal from a digital circuit such as a TTL (transistor-transistor logic), or an operational amplifier, an analog signal having a desirable voltage amplitude is generated. For example, as shown in FIG. 3, with a signal from a. FPGA 171, using buffers $172_1$ to $172_N$, and drivers $173_1$ to $173_N$, an analog signal having a desirable voltage amplitude is generated. With a signal from a FPGA 301, using buffers $302_1$ to $302_N$, and drivers $303_1$ to $303_N$, an analog signal having a desirable voltage amplitude is generated.

When the optical switch 304 (e.g., N×N optical switch) and the driving circuit (e.g., drivers $303_1$ to $303_N$) are mounted on a Printed Circuit Board: PCB, the number of the terminals required to be independently voltage controlled is the foregoing number. The electronic circuit size necessarily becomes large, so that the physical distance between the optical switch 304 and the driving circuit (e.g., drivers $303_1$ to $303_N$) requires at least several centimeters to several tens centimeters.

On the other hand, for switching an optical signal (e.g., optical packet) having a high-speed bit rate of 100 Gbit/s, high-speed ON/OFF switching of 1 ns or less is demanded. Namely, a switching signal having a bandwidth of about 1 GHz is required to be transmitted from the FPGA 301 to the optical switch 304. However, with the distance of several tens centimeters, actually, handling as a lumped parameter circuit is difficult. For this reason, mounting as a distributed parameter circuit with the characteristic impedance (e.g., 50Ω) of the transmission path to the optical switch 304 matched with the impedance of the optical switch 304 is conceivable.

For example, PTL 1 proposes an optical switch using an electric field applying type light absorbing gate. In the optical switch, a LVDS (low voltage differential signaling) signal from a FPGA is terminated at a LVDS terminating circuit, and the signal is outputted from the LVDS terminating circuit to an inverter circuit 402 using a transistor, thereby driving the optical switch.

FIGS. 4(a) and 4(b) show a circuit configuration including an inverter circuit serving as a driving circuit for driving the light absorbing gate of the optical switch. FIG. 4(a) shows the state at the time of optical signal blocking (light absorption), and FIG. 4(b) shows the state at the time of optical signal passing. In each circuit configuration of FIGS. 4(a) and 4(b), at the end of a distributed parameter line (LVDS transmission path) 403, a LVDS terminating circuit 401 is provided. A signal is outputted from the LVDS terminating circuit 401 to an inverter circuit 402. The inverter circuit 402 has a transistor $T_{11}$, and a resistance $R_{11}$ connected at one end to the drain of the transistor $T_{11}$.

With each circuit configuration shown in FIGS. 4(a) and 4(b), electric potentials of voltage $V_{D1}$ (e.g., 3 V) and voltage $V_{S1}$ (e.g., 0 V) are given, and using a signal from the LVDS terminating circuit 401, opening/closing of the transistor $T_{11}$ is performed, thereby switching the voltage to be applied to a light absorbing gate $D_{11}$ (switching operation).

For example, FIG. 4(a) shows a state in which the gate of the transistor $T_{11}$ is closed. A current does not flow to the inverter circuit 72. For this reason, the electric potential at a point A1 becomes $V_{A1}=V_{D1}$. Thus, a voltage with a reverse bias with respect to a light absorbing gate $D_{11}$ can be applied. As a result of this, light absorption due to the Franz-Keldysh: FK effect occurs, so that the signal light is blocked. In contrast, FIG. 4(b) shows a state in which the gate of the transistor $T_{11}$ is opened. A current flows from $V_{D1}$ toward $V_{S1}$. Accordingly, the electric potential at the point A1 becomes $V_{A1}=V_{S1}-V_{D1}+iR_{11} \approx 0$ V, so that a voltage is not applied to the light absorbing gate $D_{11}$. In this case, the light absorption due to the FK effect does not occur, and hence a signal light passes therethrough.

The transistor $T_{11}$ can be controlled from the LVDS terminating circuit 401, thereby driving the optical switch. In PTL 1, optical switch and the driving circuit including the transistors are integrated. For this reason, the distance between the driving circuit and the optical switch controlling terminal is short, and can be handled as a lumped constant. For this reason, high-speed switching is possible.

CITATION LIST

Patent Literature

[PTL 1] Japanese Patent Application. Publication No. 2016-218297

Non Patent Literature

[NPL 1] T. Watanabe, et. al., "Silica-based PLC 1×128 thermo-optic switch" 27th European Conference on Optical Communication (ECOC), Vol. 2, pp. 134-135, 2001.

SUMMARY OF THE INVENTION

In the optical switch shown in FIG. 2, when a MZI is used for the 2×2 optical switch 201, and an EAM is used for the optical gate 202, these operate at reverse biases. For this reason, signals having positive and negative opposite polarities are require to be given from the driving driver. When driving is performed by a driver as in PTL 1, the voltage level of the LVDS signal from the FPGA is common. For this reason, different bias potentials are given between the EAM and the MZI, thereby generating potential differences having positive and negative opposite polarities. This enables the control. The optical gate 202 using an EAM, and the 2×2 optical switch 201 using a MZI are manufactured on a Semi Insulator: SI substrate. The area is divided into an EAM area and a MZI area, which are individually applied with a bias potential, thereby electrically isolating the EAM area and the MZI area. As a result, control can be implemented. However, a connection between the EAM area and the MZI area is established by a waveguide. For this reason, complete isolation is very difficult.

The present disclosure was completed in view of the foregoing problem. It is an object of the present disclosure to provide a high-speed optical switch technology by enabling individual bias control with respect to a 2-input 2-output optical switch and an optical gate controllable through the distributed parameter line from a FPGA.

In order to attain such an object, an optical switch in accordance with one embodiment of the present invention has one optical input port, and N-th optical output ports where N is an integer of 2 or more, and includes: 2-input 2-output optical switches connected in a multistage for branching an optical signal inputted to the optical input port into N-th optical signals; N-th optical gates respectively provided at the optical output ports; driving circuits for operating the 2-input 2-output optical switches; and driving circuits for operating the optical gates independently of the 2-input 2-output optical switches. The driving circuits for operating the 2-input 2-output optical switches are integrated in the vicinity of a control electrode set on waveguides included in the 2-input 2-output optical switches, and the driving circuits for operating the optical gates are integrated in the vicinity of a control electrode set on the waveguides included in the optical gates. The waveguide included in the 2-input 2-output optical switch and the waveguide included in the optical gate each have a p layer, an i layer, and an n layer sequentially formed on a semi-insulating substrate. The optical switch has a trench reaching the semi-insulating substrate between the 2-input 2-output optical switches and the optical gates, and the trench isolates the p layer in an area of the 2-input 2-output optical switches and a p layer in an area of the optical gates.

As described up to this point, with an optical switch in accordance with one embodiment of the present invention, individual bias control becomes possible with respect to a 2-input 2-output optical switch and an optical gate controllable through the distributed parameter line from a FPGA.

BRIEF DESCRIPTION OF DRAWINGS

FIG. 4 is a view for illustrating the operation of a driving circuit, where

DESCRIPTION OF EMBODIMENTS

Below, referring to the accompanying drawings, embodiments of the present invention will be described.

Configuration of Optical Switch and Peripheral Circuit Thereof

Figure 5:
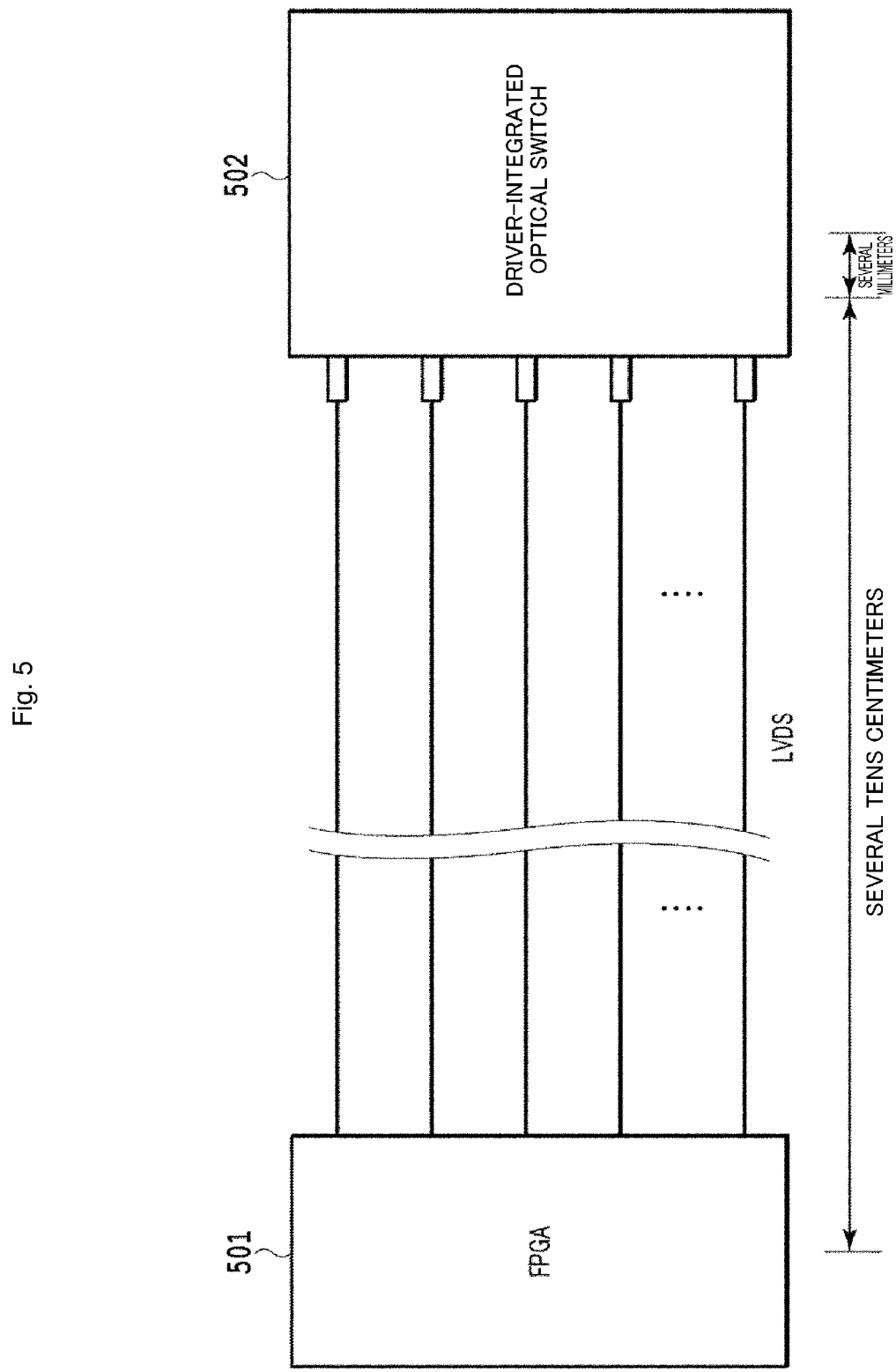
FIG. 5 is a configuration view showing a configuration of an optical switch in accordance with one embodiment of the present invention and a peripheral circuit thereof.

FIG. 5 shows a configuration of an optical switch and the peripheral circuit thereof in accordance with the present embodiment. The optical switch in accordance with the present embodiment is a driver (driving circuit)-integrated type switch. As shown in FIG. 5, a driver-integrated type optical switch 502 is connected with a PFGA 501 via a LVDS. For the driver for driving the optical switch, for example, a driving circuit using a High Electron Mobility Transistor: HEMT capable of implementing a high-speed voltage amplification circuit is used. The driver-integrated type optical switch may also be in a form in which switch elements including an optical waveguide, or the like, and a driver including a driver circuit, or the like are integrated on the same InP substrate, or may be in a form in which an optical switch chip and a driver chip are individually manufactured, and these are integrated by flip chip mounting, or the like. In the present embodiment, using a LVDS of a differential signal system using two transmission paths as an example of the distributed parameter line, the driver (driving circuit)-integrated type optical switch 502 is operated. This enables high-speed signal transmission up to several gigahertzs, low power consumption (3.5 mA driving, signal amplitude 350 mV), and high noise resistance (the same phase noise is cancelled by a differential signal).

Layer Structure of Hemt for Use in Driving Circuit of Optical Switch

Figure 6:
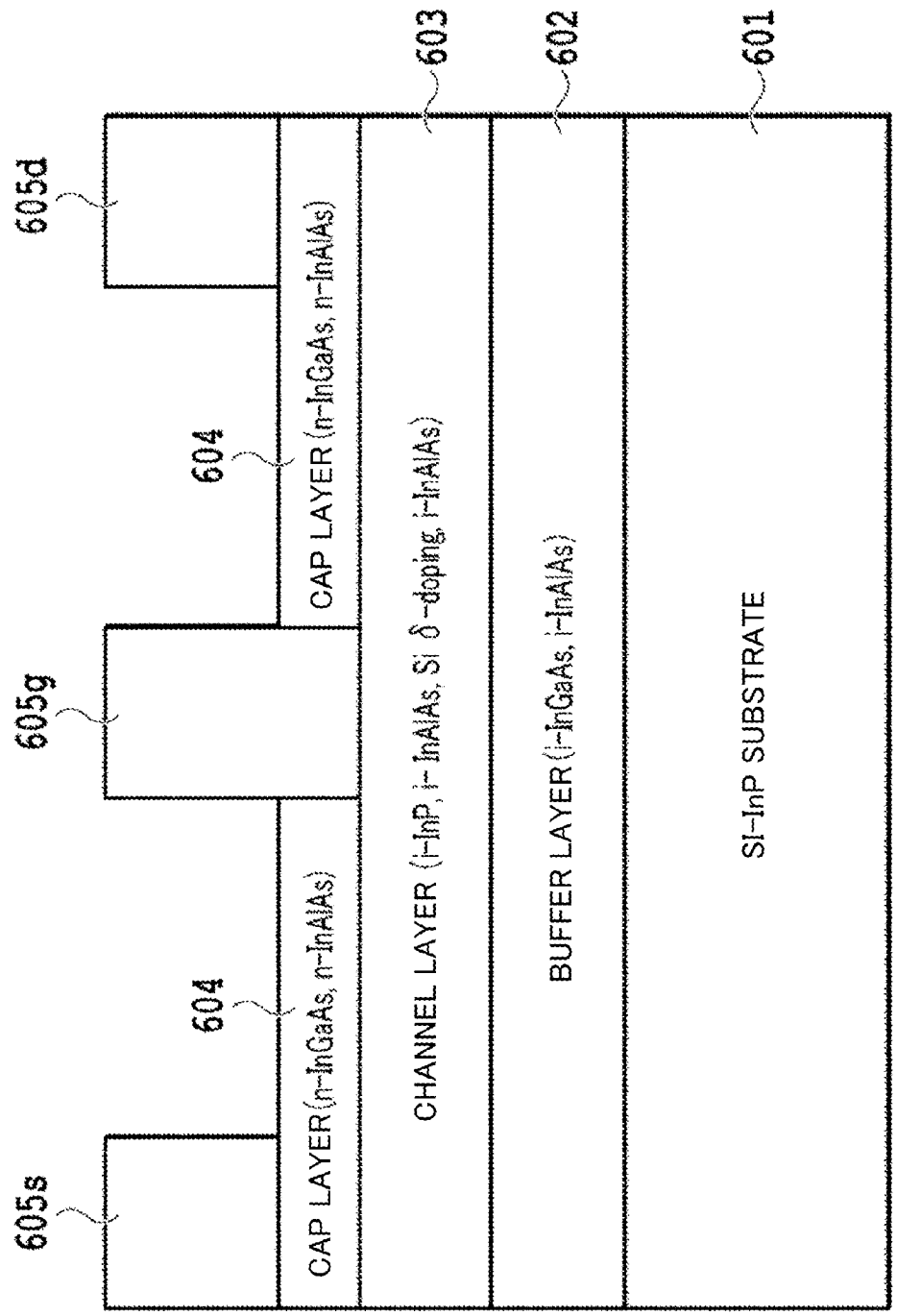
FIG. 6 is a cross sectional view showing the layer structure of HEMT in the optical switch in accordance with one embodiment of the present invention.

FIG. 6 shows the layer structure of a HEMT for use in the driving circuit of the optical switch in accordance with the present embodiment. The layer structure of the HEMT can be manufactured in the following manner. First, on a semi-insulating (Semi Insulator: SI)-InP substrate 601, i-InAlAs and i-InGaAs are sequentially stacked to form a buffer layer 602. Then, on the buffer layer 602, i-InAlAs, Si δ-doped layer, i-InAlAs, and an i-InP layer are sequentially stacked to form a channel layer 603. Further, on the channel layer 603, n-InAlAs and n-InGaAs are sequentially stacked to form a cap layer 604. Then, a gate electrode $605_g$ is formed between the channel layers 603 on the channel layer 603, and a source electrode $605_s$ and a drain electrode $605_d$ are formed on the cap layer 604.

With the HEMT in accordance with the present embodiment, the gate length is set at 0.1 μm, and the gate width is set at 25 μm. The design values become important parameters for determining the characteristics of the HEMT. The gate length determines the response speed of the HEMT. However, it is known as follows: with a gate length of 0.1 μm as in the present embodiment, the operation in response to a high speed signal up to GHz is implemented. Further, by determining the size of the gate width, it Is possible to determine the value of the current flowing between the source and the drain.

Configuration of Optical Switch

Figure 1:
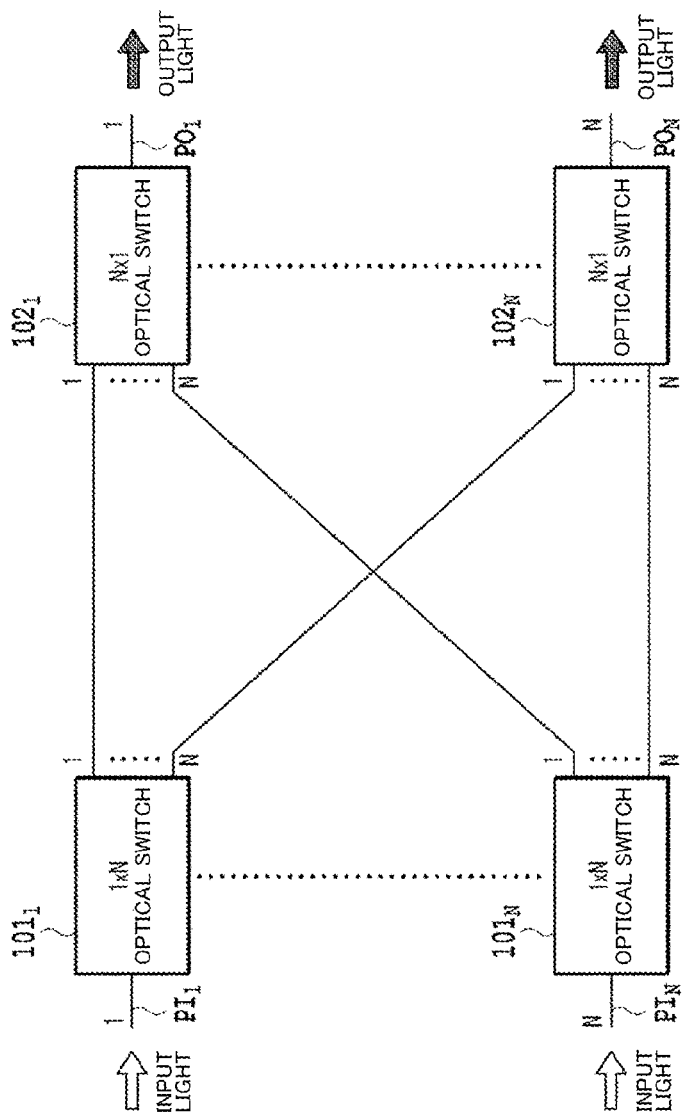
FIG. 1 is a configuration view showing a configuration of an N×N optical switch.
Figure 2:
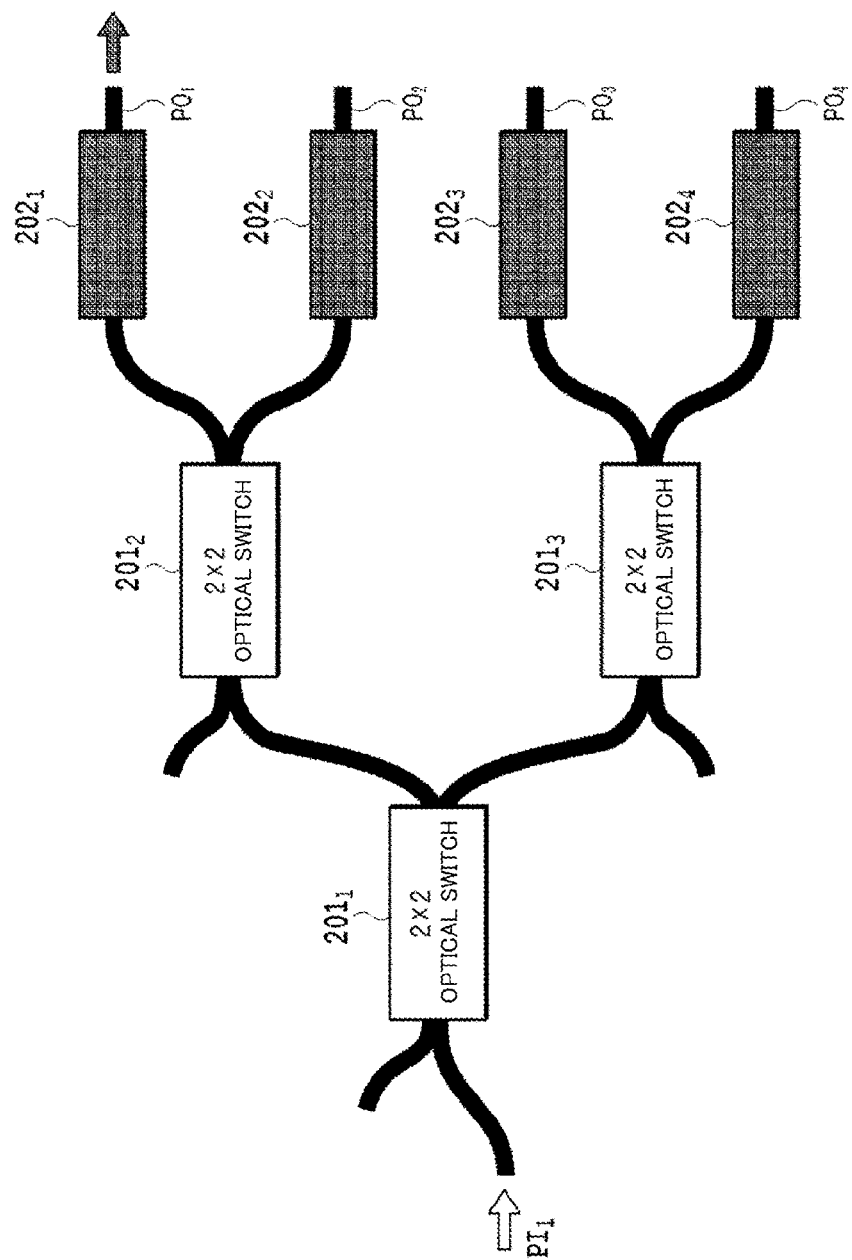
FIG. 2 is a configuration view showing a configuration of a tree type 1×N optical switch when n=4.
Figure 3:
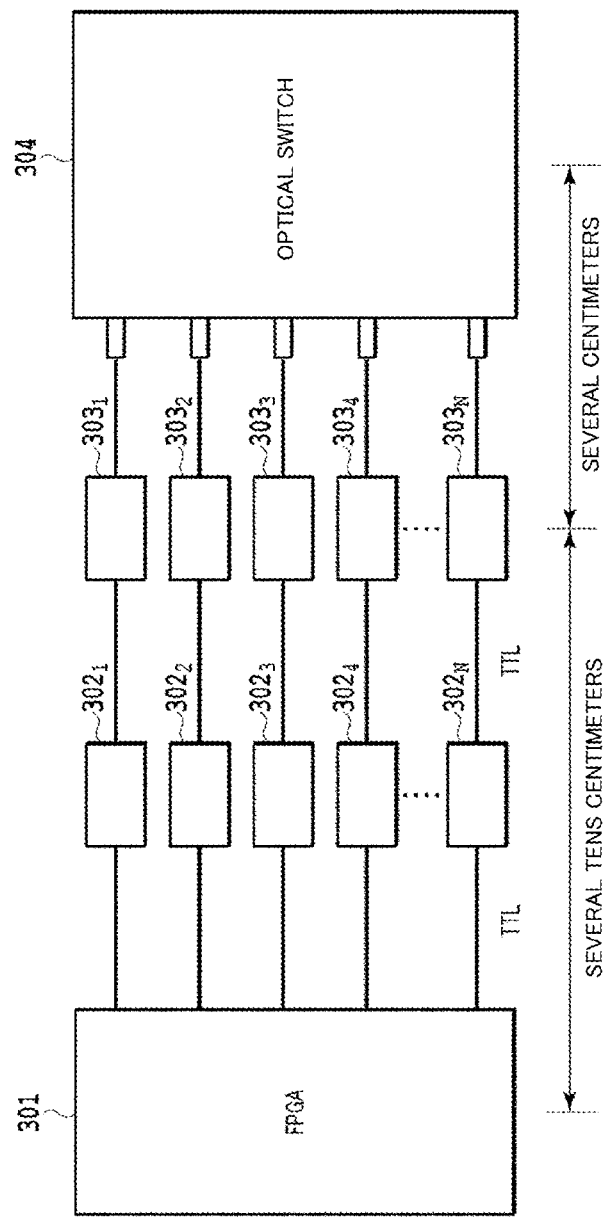
FIG. 3 is a configuration view showing a configuration of an optical switch and a peripheral circuit.
Figure 4A:
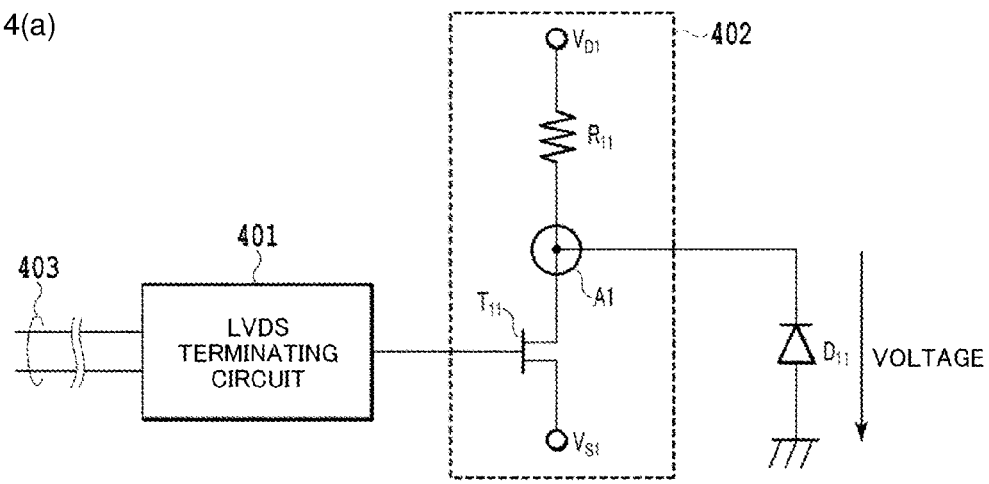
FIG. 4(a) shows the time of signal light blocking.
Figure 4B:
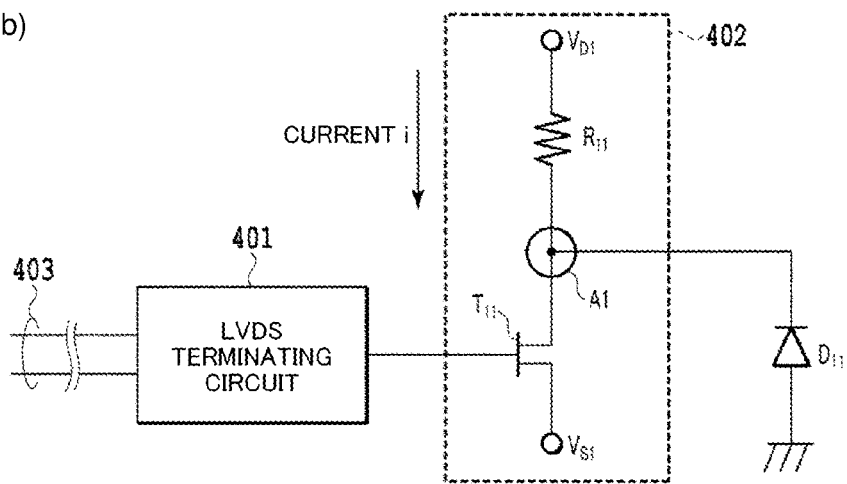
FIG. 4(b) is the time of signal light passing.

The configuration of the optical switch in accordance with the present embodiment includes 2×2 optical switches arranged and connected in a multistage in a tree shape and optical gates as with that shown in FIG. 2. Each of the two outputs of the 2×2 optical switch at the previous stage and one of the two inputs of the 2×2 optical switch at the latter stage are connected via a connection optical waveguide. Whereas, at each of the two outputs of the 2×2 optical switch at the latter stage of the final stage, an optical gate is provided. The two outputs of the 2×2 optical switch at the latter stage and the optical gate are connected via a connection optical waveguide. The 2×2 optical switches are arranged and connected in a tree shape so that the number of outputs of the 2×2 optical switches at the final stage may become N. Namely, the optical switch has N-th optical gates. The driving circuits for driving the 2×2 optical switches are integrated in the vicinity of the control electrode set on the waveguide forming the 2×2 optical switch. Similarly, the driving circuits for operating the optical gates are integrated in the vicinity of the control electrode set on the waveguide forming the driving circuits. The driving circuit for driving the 2×2 optical switch and the driving circuit for driving the optical gate mutually independently drive the 2×2 optical switch and the optical gate, respectively. As a result of this, the optical switch switches the optical signal inputted to the optical input port of one of the two inputs of the 2×2 optical switch at the first stage to desirable N-th optical output ports (optical gates). For example, when n=4, as shown in FIG. 2, the optical signal inputted from the optical input port $PI_1$ of the 2×2 optical switch $201_1$ is waveguided and outputted to the optical gate $202_1$ connected to the desirable optical output port. (e.g., $PO_1$) by switching of the optical paths of the 2×2 optical switches $201_1$ to $201_3$. On the other hand, the cross talk light leaked out to the optical gates $202_2$ to $202_4$ connected to the optical output ports (e.g., $PO_2$ to $PO_4$) other than the desirable optical output port is blocked by the optical gates. For example, the 2×2 optical switch can be set as a 2×2 MZI having two arm optical waveguides (which will be hereinafter referred to as a MZI optical switch).

Operation of Mzi Optical Switch

The operation of a MZI optical switch will be described. A Multi-Mode interference: MMI type optical coupler on the input side of the MZI optical switch branches the optical signal in from one of the two input ports into two arm optical waveguides. A MMI optical coupler on the output side multiplexes the optical signals that have undergone phase difference by two arm optical waveguides, and outputs the signal from one output of the two output ports. Due to the interference effect at the MMI optical coupler on the output side, when the phase difference given by the two arm optical waveguides is $\pm n\pi$, an optical signal is outputted from the output port (cross port) opposite to the input port, and when the phase difference given by the two arm optical waveguides is $\pm(2n+1)\pi/2$, the signal is outputted from the output port (bar port) on the same side as that of the input port. Therefore, a phase modulation area is arranged at one of the two arm optical waveguides, and the optical signal to be waveguided is subjected to phase modulation, thereby controlling the phase difference given by the two arm optical waveguides. This can provide a 2×2 switching operation in the MZI optical switch. In order to obtain phase modulation, it is essential only that the refractive index of the arm optical waveguide is changed. With an InP type optical waveguide, using the FK effect or the QCSE effect due to voltage application, or the plasma effect due to current injection, the refractive index of the optical waveguide is changed. With the LN type, using the Pockels effect due to voltage application, the refractive index of the optical waveguide is changed. As a result, a switching operation can be performed. Alternatively, for the MMI optical coupler for halving the optical strength, a directional coupler, or the like may be used. When the injection current to the two arm optical waveguides is 0 mA, the inputted optical signal is outputted to the cross port side of the 2×2 switch.

Figure 7:
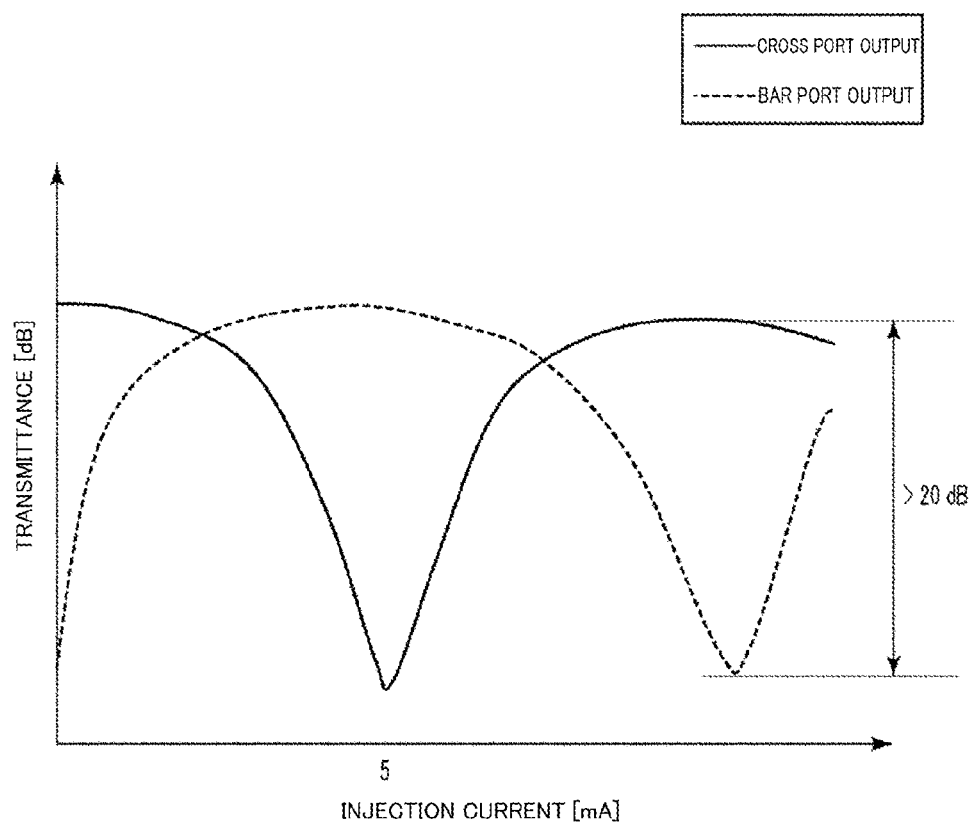
FIG. 7 is a graph showing the transmittance with respect to the injection current of a 2×2 MZI which is a graph showing the transmittance with respect to the injection current of a 2×2 MZI.

FIG. 7 shows the transmittance with respect to the injection current of the 2×2 MZI. As shown in FIG. 7, when a current is injected to the control electrode provided at one of the two arm optical waveguides of the 2×2 switch, the refractive index of the arm optical waveguide to which a current has been injected changes, resulting in a change in phase of the propagating optical signal. When the injection current to the arm optical waveguide becomes about 5 mA, the optical output from the cross port of the two optical output ports of the 2×2 switch is minimized, and the optical output to the bar port of the two optical output ports is maximized. At this step, a ratio of the optical output to the cross port and the optical output to the bar port of 20 dB or more can be obtained.

Operation of Optical Gate

Then, the operation of the optical gate will be described. At the optical gate provided at the final stage of the 2×2 optical switch, blocking of the leaked light whose output is not desired is performed. With switching of the 2×2 optical switch, while most of the optical signals are guided to a desirable port, a part of the optical signals are leaked to different ports from the desirable port. The leaked light deteriorates the quality of the transmission signal, and hence is required to be minimized. In the case of the optical gate using the EAM of InP, a reverse bias is applied between the p type electrode and the n type electrode. As a result, due to the Franz-Keldysh: FK effect, the absorption end of the core of the waveguide forming the optical gate is shifted, so that the absorption coefficient of the light propagating through the optical gate can be increased.

Figure 8:
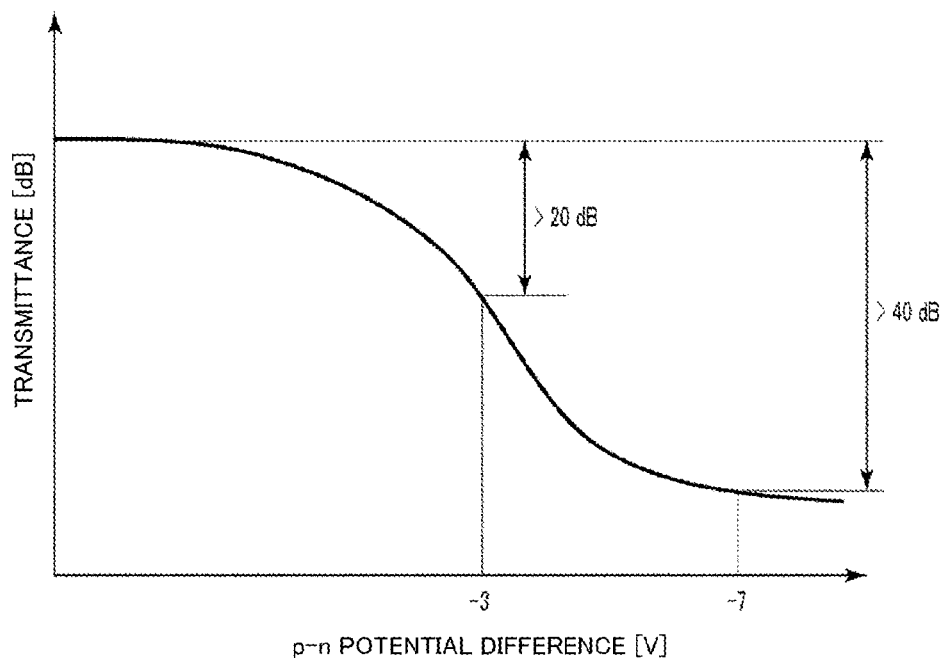
FIG. 8 is a graph showing the transmittance with respect to the application voltage of a light absorbing gate.

FIG. 8 shows the transmittance with respect to the application voltage of the light absorbing gate. As shown in FIG. 8, for example, when the application voltage is −3 V, an extinction ratio of 20 dB or more can be obtained. When the application voltage is −7 V, an extinction ratio of 40 dB or more can be obtained. As the optical gate, a SOA which can be implemented by the same InP material, or the like may be used.

Waveguide Forming Optical Switch

Figure 9:
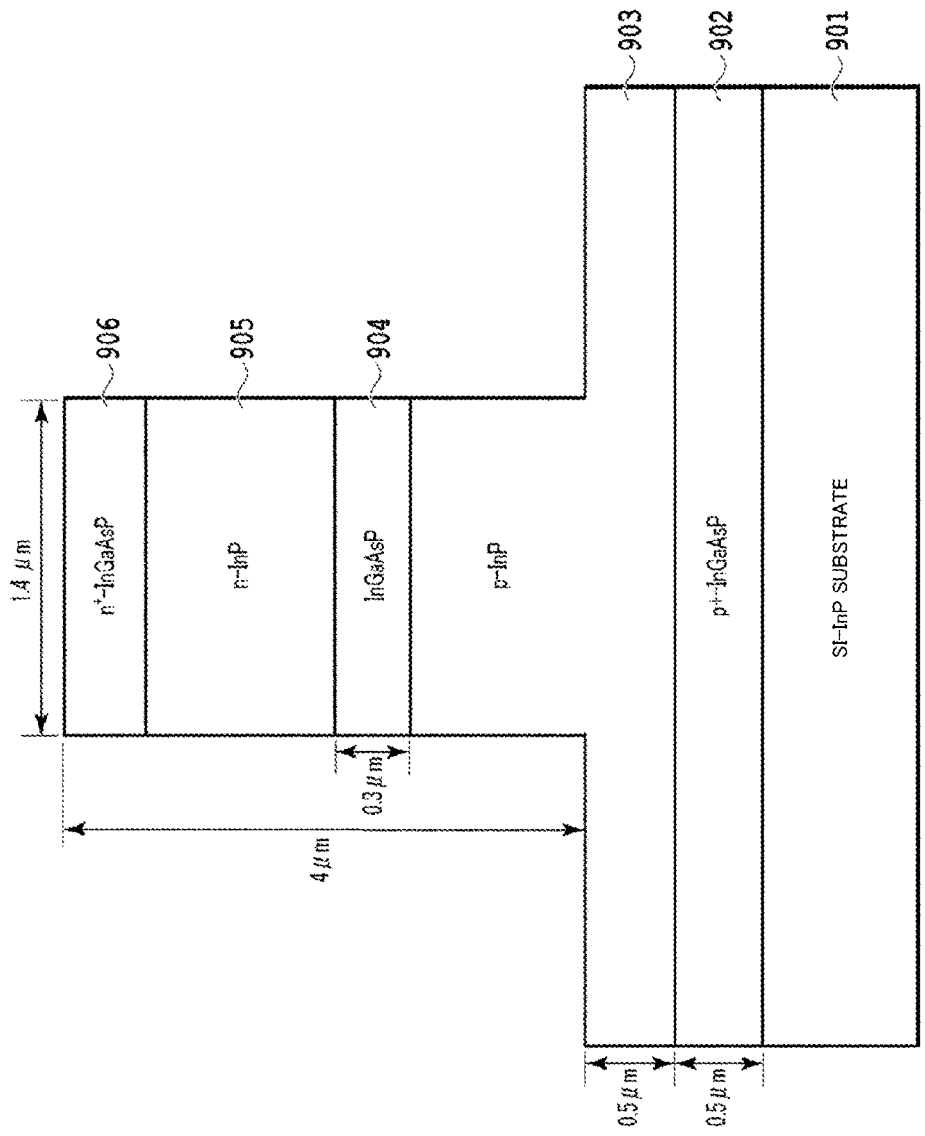
FIG. 9 is a view showing the cross sectional structure of a waveguide forming the optical switch in accordance with the present embodiment.

FIG. 9 shows the cross sectional structure of a waveguide forming the optical switch in accordance with the present embodiment. As shown in FIG. 9, the waveguide forming the optical switch has a structure of stacking of a laminated structure including, on a SI-InP substrate 901, a P$^+$-InGaAsP contact layer 902, a p-InP lower cladding layer 903 serving as a p layer, an InGaAsP core layer 904 serving as an i layer, an n-InP upper cladding layer 905 serving as an n layer, and an n$^+$-InGaAsP contact layer 906 formed sequentially therein.

The waveguide forming the optical switch was manufactured by etching to the underlying portion of the InGaAsP core layer 904, resulting in a deep ridge waveguide having a pin double hetero junction structure. The height of the waveguide was set at 4 µm, and the width thereof was set at 1.4 µm.

Although conventional optical switch is normally manufactured on a substrate, in the present embodiment, an optical switch is manufactured on a SI substrate, thereby isolating the substrate potentials of the MZI and the EAM. With the optical switch on an n substrate, the substrate back surface was the common electrode. However, by manufacturing an optical switch on a SI substrate with a high resistivity, it becomes possible to isolate the substrate potentials of the MZI and the EAM.

Integrated Structure of Mzi and Eam in Optical Switch

Figure 10:
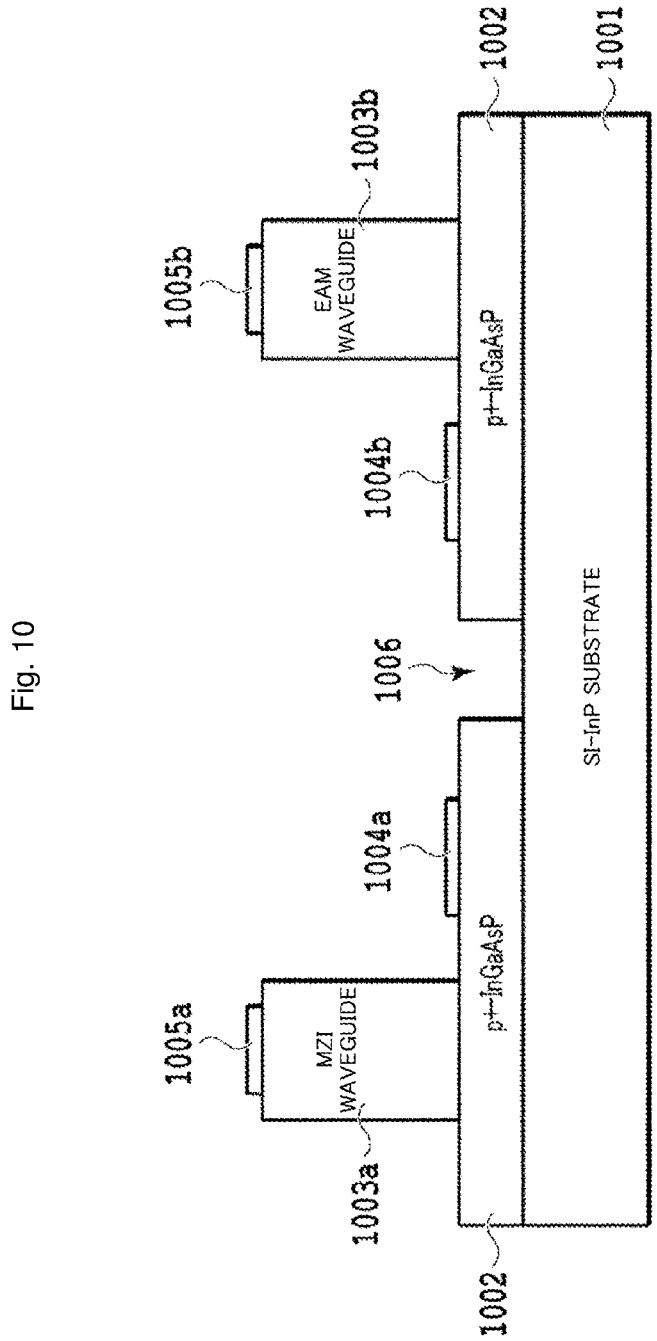
FIG. 10 is a view showing the integrated structure of a MZI and an EAM in the optical switch in accordance with the present embodiment.

FIG. 10 shows the integrated structure of the MZI and the EAM in the optical switch in accordance with the present embodiment. In the present embodiment, using the layer structure formed uniformly on the entire upper surface of the SI substrate, the integrated structure of the MZI as the optical switch, and the EAM as the optical gate is implemented. Namely, the formation of the waveguide of the MZI and the optical gate, and the formation of the electrode are performed all together. Then, a trench for isolating the MZI and the optical gate is manufactured. As shown in FIG. 10, first, on a SI-InP substrate 1001 common to the MZI and the EAM, a p$^+$-InGaAsP contact layer 1002 is formed. Then, on the p$^+$-InGaAsP contact layer 1002, a waveguide 1003a of the MZI and a waveguide 1003b of the EAM are formed, respectively. The waveguide 1003a of the MZI and the waveguide 1003b of the EAM include the p-InP lower cladding layer 903 serving as a p layer, the InGaAsP core layer 904 serving as an i layer, the n-InP upper cladding layer 905 serving as an n layer, and the n$^+$-InGaAsP contact layer 906 described by reference to FIG. 9. Further, on the top of the waveguide 1003a of the MZI and on the top of the waveguide 1003b of the EAM, an n type electrode 1005a for the MZI and an n type electrode 1005b for the EAM are formed, respectively. Then, on the p$^+$-InGaAsP contact layer 1002, a p type electrode 1004a for the MZI and a p type electrode 1004b for the EAM are formed. Finally, a trench 1006 for isolating the bias potential of the MZI and the bias potential of the EAM is formed. The trench 1006 reaches the SI-InP substrate 1001, and isolates the p layer in the MZI area and the p layer in the EAM area except for the area of the connection optical waveguide for connecting the MZI and the EAM.

For manufacturing an optical switch on the SI-InP substrate 1001, it is assumed as follows: the structure in the perpendicular direction of the device is set as the conventionally often implemented structure in which the underlying layer of the waveguide core layer (InGaAsP core layer 904) is set as an n type electrode, and the overlying layer thereof is set as a p type electrode; as a result, in the optical switch operation, a difference from the related art regarding the direction of the signal for operating the device can be reduced. However, in the present embodiment, the structure in the perpendicular direction of the device is inverted upside down. The underlying layer of the waveguide core is set as a p type electrode, and the overlying layer thereof is set as an n type electrode. This is for avoiding the difficulty described below using the fact that a p type semiconductor and an n type semiconductor are several tens times or more different in electric conductivity even when they have the same doping concentration, and that the n type semiconductor is low in resistivity. For isolating the bias potential of the MZI and the bias potential of the EAM, the trench 1006 is formed down to under the underlying electrode layer of the core of the waveguide, thereby increasing the resistivity between the MZI area and the EAM area. However, when the n type semiconductor layer is present at the underlying layer, the resistivity is low, and hence isolation becomes difficult. The MZI area and the EAM area are connected by a connecting waveguide. For this reason, the complete isolation between the p layer in the MZI area and the p layer in the EAM area is impossible, and the resistivity is required to be considered.

Manufacturing Method of Optical Switch

Then, referring to FIG. 9, a method for manufacturing an optical switch in accordance with the present embodiment will be described.

First, on a SI-InP substrate 901, a $p^+$-InGaAsP contact layer 902, a p-InP lower cladding layer 903, a 1.4-Q-composition and 0.3-μm-thick bulk i-InGaAsP core layer 904, an n-InP upper cladding layer 905, and an $n^+$-InGaAsP contact layer 906 are grown by Metal Organic Vapor Phase Epitaxy: MOVPE. Then, by photolithography and dry etching, a deep ridge waveguide structure is formed all together. Subsequently, Benzocyclobutene: BCB of an organic material capable of being buried in a local area, and excellent in planarization is coated by spin coating, and is etched back until the substrate surface is exposed by RIE (Reactive Ion Etching) using an $O_2/C_2F_6$ mixed gas, thereby planarizing the surface of the substrate. Then, by photolithography and dry etching, a well for forming an electrode for ground electrode is manufactured, and p type electrodes (1004a and 1004b) are formed. Finally, on the 2×2 optical switch and on the optical gate, n type electrodes (1005a and 1005b) are formed. As described up to this point, it becomes possible to perform MOVPE; growth and the formation of the optical waveguide structure all together.

In the present embodiment, the 0.3-μm-thick, 1.4-μm-wide, and 1.4-Q-composition InGaAsP layer is used. The design values become the important parameters for determining the optical characteristics of the optical switch. For example, when the wavelength of the optical signal to be inputted is 1.53 μm to 1.57 m, in order to implement the low-loss, high-speed, and low power consumption operation of the optical switch, the following conditions (1) to (3) are preferably satisfied.

(1) The thickness of the InGaAsP core layer 904 preferably falls within the range of 0.1 μm to 0.4 μm, of the single mode guiding condition with respect to the optical signal to be inputted, and the condition having sufficient light confinement to the InGaAsP core layer.

(2) The width of the InGaAsP core layer 904 desirably falls within the range of 0.8 μm to 3 μm, of the single mode guiding condition with respect to the optical signal to be inputted.

(3) From the viewpoint of reducing the power consumption of the driving circuit, desirably, the condition is such that the application voltage to the optical gate is 7 V or less, and desirably the composition of the InGaAsP core layer 904 is 1.3 Q to 1.5 Q, and each electrode length falls within the range of 100 μm to 2000 μm.

Although a description has been given that, for the optical switch in the present embodiment, as the InGaAsP core layer 904 of the optical gate, the bulk layer is used, a multiple quantum well structure may be adopted. In that case, it becomes possible to perform quenching with high efficiency at the optical gate due to the Quantum Confined Stark Effect. Further, although the optical waveguide structure is set as a ridge waveguide structure, the optical waveguide structure may be manufactured as other structures, example, a deep ridge type optical waveguide structure.

Alternatively, a buried type optical waveguide structure in which both sides of the InGaAsP core layer 904 are buried with a semiconductor, a rib type optical waveguide structure, or the like is also acceptable.

Further, although a description has been given using the InP type compound semiconductor in the present embodiment, a GaAs type compound semiconductor may be used. Alternatively, even using a material type capable of a change in refractive index and absorption coefficient of the nano-second order such as a silicon wire waveguide, the present invention can be implemented similarly.

Example

Figure 11:
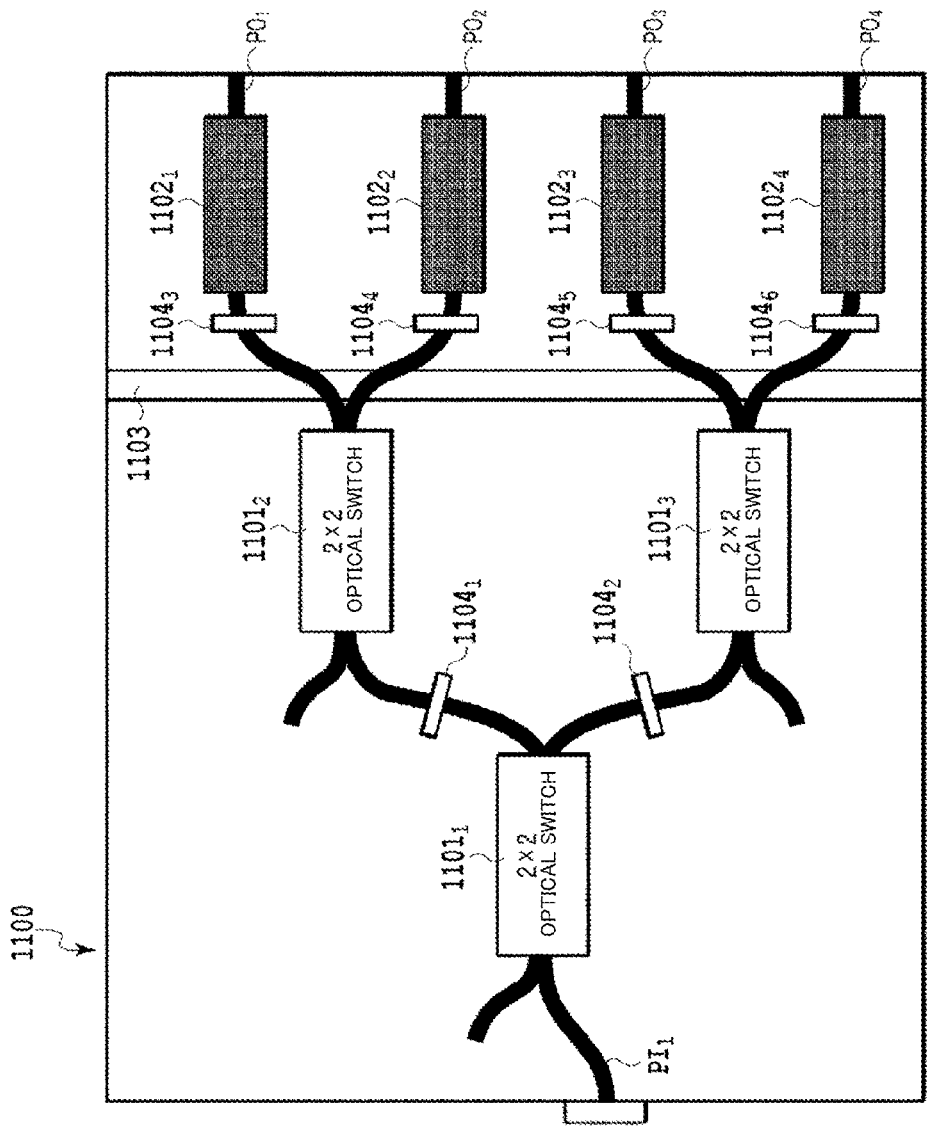
FIG. 11 is a view for illustrating Example of an optical switch.

FIG. 11 shows the optical switch structure in accordance with Example of the present invention. An optical switch chip 1100 of the present Example is a 1-input 4-output optical switch. As shown in FIG. 11, three 2×2 optical switches $1101_1$ to $1101_3$ arranged in a multistage in a tree shape, and four optical gates $1102_1$ to $1102_4$ are integrated. Each of the two outputs of the 2×2 optical switch $1101_1$ at the initial stage and one of respective two inputs of the 2×2 optical switches $1101_2$ and $1101_3$ at the final stage are connected with each other via a connection optical waveguide. Respective two outputs of the 2×2 optical switches $1101_2$ and $1101_3$ at the final stage are provided with optical gates $1102_1$ to $1102_4$, respectively. Respective two outputs of the 2×2 optical switches $1101_2$ and $1101_3$ at the final stage and the optical gates $1102_1$ to $1102_4$ are connected with each other via connection optical waveguides.

In the optical switch chip 1100, driving circuits (not shown) for operating the 2×2 optical switches $1101_1$ to $1101_3$ are integrated in the vicinity of the control electrode (not shown) set on the waveguide forming the 2×2 optical switch. Similarly, the driving circuits (not shown) for operating the optical gates $1102_1$ to $1102_4$ are integrated in the vicinity of the control electrode (not shown) set on the waveguide forming the optical gate. The driving circuits for operating the 2×2 optical switches and the driving circuits for operating the optical gates mutually independently drive the 2×2 optical switches and the optical gates, respectively.

The 2×2 optical switch 1101, the optical gate 1102, and the connection optical waveguide are deep ridge waveguides having a pin double hetero junction structure as described by reference to FIG. 9.

Further, the optical switch chip 1100 of Example has a p layer isolating trench 1103 for isolating the p layer in the area where the 2×2 optical switches $1101_1$ to $1101_3$ are formed, and the p layer in the area where the optical gates $1102_1$ to $1102_4$ are formed. Further, the optical switch chip 1100 of the present Example has n layer isolating trenches $1104_1$ to $1104_6$ at the connection optical waveguide for connecting the 2×2 optical switch $1101_1$ and the 2×2 optical switch $1101_2$, the connection optical waveguide for connecting the 2×2 optical switch $1101_1$ and the 2×2 optical switch $1101_3$, the connection optical waveguides for connecting the 2×2 optical switch $1101_2$ and the optical gate $1102_1$ and the optical gate $1102_2$, and the connection optical waveguides for connecting the 2×2 optical switch $1101_3$, and the optical gate $1102_3$ and the optical gate $1102_4$.

The optical signal inputted from the optical input port $PI_1$ of the 2×2 optical switch $1101_1$ is guided and outputted to the optical gate $202_1$ connected to the desirable optical output port (e.g., $PO_1$) of the four optical output ports $PO_1$ to $PO_4$ by switching between optical paths of the 2×2 optical switches $1101_1$ to $1101_3$. On the other hand, the cross talk light leaked out to the optical gates $1102_2$ to $1102_4$ connected to the optical output ports (e.g., $PO_2$ to $PO_4$) other than the desirable optical output port is blocked by the optical gates.

The 2×2 optical switch 1101 is a 2×2 MZI (MZI optical switch), and the optical gate 1102 is an EAM. As described in the embodiment, in the 2×2 MZI and the EAM, the p type electrode and the p type semiconductor layer are present at the underlying layer of the waveguide core layer. For this reason, the p layer isolating trench 1103 is a deep trench extending to the SI substrate. The optical signal is assumed to propagate in the longitudinal direction of the optical switch chip 1100. The p layer isolating trench 1103 is formed between the area where the 2×2 optical switch 1101 is formed and the area where optical gate 1102 is formed. The p layer isolating trench 1103 is formed from one end to the other end of a chip in the transverse direction of the optical switch chip 1100. In consideration of the resistance value between the area where the 2×2 optical switch is formed and the area where the optical gate is formed, the width of the trench is desirably 10μ or more. However, in the connecting waveguide for establishing a connection between the two areas, the p layer situated at the underlying layer of the core layer of the waveguide cannot be removed. For this reason, the p layer is left with a width as much as the width of the connection optical waveguide.

In order to isolate the bias potential of the 2×2 optical switch 1101 and the bias potential of the optical gate 1102 at a high resistance, the structure in which the p layer and the n layer are inverted is adopted. However, the lowness of the resistivity of the n layer situated at the overlying layer of the core layer of the waveguide also matters. As for the n layer, overall etching is performed with the area for forming a control electrode therein left behind, thereby regrowing high-resistance Fe-doped InP. By this procedure, or other procedures, it is also possible to increase the resistivity between the electrodes. However, when regrowth is performed from the core layer of the waveguide, a problem may occur in crystal quality, so that the deterioration of the characteristic such as the propagation loss of the waveguide is feared. Thus, an n layer isolating trench 1104 is formed in the cladding layer of the connection optical waveguide between the control electrodes, thereby performing electric isolation of the n layer. The n layer isolating trenches 1104 are formed, in addition to at the connection optical waveguides between respective 2×2 optical switches 1101, at each connection optical waveguide between the 2×2 optical switch 1101 and the optical gate 1102. In the optical switch chip 1100 shown in FIG. 11, the n layer isolating trench $1104_1$ is formed at the cladding layer of the connection optical waveguide between the 2×2 optical switch $1101_1$ and the 2×2 optical switch $1101_2$, and the n layer isolating trench $1104_2$ is formed at the cladding of the connection optical waveguide between the 2×2 optical switch $1101_1$ and the 2×2 optical switch $1101_3$. Further, in the optical switch chip 1100, the n layer isolating trench $1104_3$ is formed at the cladding layer of the connection optical waveguide between the 2×2 optical switch $1101_2$ and the optical gate $1102_1$. In the optical switch chip 1100, the n layer isolating trench $1104_4$ is formed at the cladding layer of the connection optical waveguide between the 2×2 optical switch $1101_2$ and the optical gate $1102_2$. In the optical switch chip 1100, the n layer isolating trench $1104_5$ is formed at the cladding layer of the connection optical waveguide between the 2×2 optical switch $1101_3$ and the optical gate $1102_3$. In the optical switch chip 1100, the n layer isolating trench $1104_6$ is formed at the cladding layer of the connection optical waveguide between the 2×2 optical switch $1101_3$ and the optical gate $1102_4$. A trench deep enough not to leave the n layer of the upper cladding layer formed on the upper side of the core layer of the waveguide provides an expectation for an increase in resistivity. However, the influences of scattering or reflection of a light propagating through the connection optical waveguide, and the like are also feared. Therefore, desirably, the width (the length in the direction of traversing in the direction of propagation of the light) of the n layer isolating trench 1104 is 1 μm or more, and the depth thereof is the length between the n type contact layer and the core layer of the waveguide (the depth reaching the core layer of the waveguide).

As described above, by forming the p layer isolating trench 1103 and the n layer isolating trench 1104, it is possible to establish an electric isolation between the 2×2 optical switch (2×2 MZI) and the optical gate (EAM). This enables individual bias control. For this reason, high-speed optical switch by driver direct control using a signal from the FPGA can be implemented.

The invention claimed is:

1. An optical switch having one optical input port, and N-th optical output ports where N is an integer of 2 or more, the optical switch, comprising:
    2-input 2-output optical switches connected in a multi-stage for branching an optical signal inputted to the optical input port into N-th optical signals;
    N-th optical gates respectively provided at the optical output ports;
    driving circuits for operating the 2-input 2-output optical switches; and
    driving circuits for operating the N-th optical gates independently of the 2-input 2-output optical switches;
    wherein the driving circuits for operating the 2-input 2-output optical switches are integrated adjacent to a control electrode set on waveguides included in the 2-input 2-output optical switches,
    the driving circuits for operating the N-th optical gates are integrated adjacent to a control electrode set on waveguides included in the N-th optical gates,
    the waveguide included in the 2-input 2-output optical switch and the waveguide included in the N-th optical gates each have a p layer, an i layer, and an n layer sequentially formed on a semi-insulating substrate,
    a trench reaching the semi-insulating substrate is included between the 2-input 2-output optical switches and the N-th optical gates, and the trench isolates the p layer in an area of the 2-input 2-output optical switches and a p layer in an area of the N-th optical gates.

2. The optical switch according to claim 1, wherein the trench isolates a bias potential of the area of the 2-input 2-output optical switches and a bias potential of the area of the N-th optical gates.

3. The optical switch according to claim 2,
    wherein the 2-input 2-output optical switches are a 2-input 2-output MZI having two arm optical waveguides, and
    two output ports of the 2-input 2-output MZI at a previous stage and one of two input ports of the 2-input 2-output MZI at a latter stage are connected in a tree shape by a connection optical waveguide.

4. The optical switch according to claim 2, wherein the N-th optical gates are electro-absorption optical gates.

5. The optical switch according to claim 2, wherein the driving circuits for operating the 2-input 2-output optical switches, and the 2-input 2-output optical switches, and the driving circuits for operating the N-th optical gates, and the N-th optical gates are integrated on the same semi-insulating substrate.

6. The optical switch according to claim 2, wherein the driving circuits for operating the 2-input 2-output optical switches, and the 2-input 2-output optical switches are integrated by flip chip mounting, and the driving circuits for operating the N-th optical gates, and the N-th optical gates are integrated by flip chip mounting.

7. The optical switch according to claim 1,
wherein the 2-input 2-output optical switches are a 2-input 2-output MZI having two arm optical waveguides, and
two output ports of the 2-input 2-output MZI at a previous stage and one of two input ports of the 2-input 2-output MZI at a latter stage are connected in a tree shape by a connection optical waveguide.

8. The optical switch according to claim 7,
wherein the connection optical waveguide has a p layer, an i layer, and an n layer sequentially formed on the semi-insulating substrate, and
the optical switch further has a trench formed in a cladding layer of the connection optical waveguide, and an electric cross talk of the n layer between the 2-input 2-output optical switches is isolated.

9. The optical switch according to claim 8, wherein the N-th optical gates are electro-absorption optical gates.

10. The optical switch according to claim 8, wherein the driving circuits for operating the 2-input 2-output optical switches, and the 2-input 2-output optical switches, and the driving circuits for operating the N-th optical gates, and the N-th optical gates are integrated on the same semi-insulating substrate.

11. The optical switch according to claim 8, wherein the driving circuits for operating the 2-input 2-output optical switches, and the 2-input 2-output optical switches are integrated by flip chip mounting, and the driving circuits for operating the N-th optical gates, and the N-th optical gates are integrated by flip chip mounting.

12. The optical switch according to claim 7, wherein the N-th optical gates are electro-absorption optical gates.

13. The optical switch according to claim 7, wherein the driving circuits for operating the 2-input 2-output optical switches, and the 2-input 2-output optical switches, and the driving circuits for operating the N-th optical gates, and the N-th optical gates are integrated on the same semi-insulating substrate.

14. The optical switch according to claim 7, wherein the driving circuits for operating the 2-input 2-output optical switches, and the 2-input 2-output optical switches are integrated by flip chip mounting, and the driving circuits for operating the N-th optical gates, and the N-th optical gates are integrated by flip chip mounting.

15. The optical switch according to claim 1, wherein the N-th optical gates are electro-absorption optical gates.

16. The optical switch according to claim 15, wherein the driving circuits for operating the 2-input 2-output optical switches, and the 2-input 2-output optical switches, and the driving circuits for operating the N-th optical gates, and the N-th optical gates are integrated on the same semi-insulating substrate.

17. The optical switch according to claim 8, wherein the driving circuits for operating the 2-input 2-output optical switches, and the 2-input 2-output optical switches are integrated by flip chip mounting, and the driving circuits for operating the N-th optical gates, and the N-th optical gates are integrated by flip chip mounting.

18. The optical switch according to claim 1, wherein the driving circuits for operating the 2-input 2-output optical switches, and the 2-input 2-output optical switches, and the driving circuits for operating the N-th optical gates, and the N-th optical gates, are integrated on the same semi-insulating substrate.

19. The optical switch according to claim 1, wherein the driving circuits for operating the 2-input 2-output optical switches, and the 2-input 2-output optical switches are integrated by flip chip mounting, and the driving circuits for operating the N-th optical gates, and the N-th optical gates are integrated by flip chip mounting.

* * * * *